United States Patent
Lin (10) Patent No.: US 11,507,742 B1
(45) Date of Patent: Nov. 22, 2022

(54) LOG PARSING USING LANGUAGE PROCESSING

(71) Applicant: Rapid7, Inc., Boston, MA (US)

(72) Inventor: Wah-Kwan Lin, Melrose, MA (US)

(73) Assignee: Rapid7, Inc., Boston, MA (US)

(*) Notice: Subject to any disclaimer, the term of this patent is extended or adjusted under 35 U.S.C. 154(b) by 573 days.

(21) Appl. No.: 16/454,220

(22) Filed: Jun. 27, 2019

(51) Int. Cl.
```
G06F 40/205   (2020.01)
G06N 3/08     (2006.01)
G06N 3/04     (2006.01)
G06F 40/295   (2020.01)
H04L 9/40     (2022.01)
```

(52) U.S. Cl.
CPC ............ *G06F 40/205* (2020.01); *G06N 3/04* (2013.01); *G06N 3/08* (2013.01); *H04L 63/1425* (2013.01); *G06F 40/295* (2020.01)

(58) Field of Classification Search
CPC ........ H04L 63/1425; G06N 3/04; G06N 3/08; G06F 40/295; G06F 40/205
See application file for complete search history.

(56) References Cited

U.S. PATENT DOCUMENTS

| | | | | |
|---|---|---|---|---|
| 9,190,055 | B1* | 11/2015 | Kiss | G10L 15/063 |
| 2015/0373039 | A1* | 12/2015 | Wang | H04L 63/1425 |
| | | | | 726/23 |
| 2017/0118240 | A1* | 4/2017 | Devi Reddy | H04L 63/1433 |
| 2019/0130009 | A1* | 5/2019 | McLean | G06F 16/2365 |

OTHER PUBLICATIONS

Chen et al., "Named Entity Recognition with Gated Convolutional Neural Networks", 2017, Springer International, whole document (Year: 2017).*
Suh-Lee et al., Text Mining for Security Threat Detection, 2016, IEEE, whole document (Year: 2016).*

* cited by examiner

*Primary Examiner* — Sonia L Gay
(74) *Attorney, Agent, or Firm* — Ashwin Anand (57) ABSTRACT

Methods and systems for parsing log records. A method involves receiving a log record including data regarding a network device's operation and providing the log record to a natural language processing model. The natural language processing model may analyze the log record to identify items in the log record and relationships between items in the log record.

20 Claims, 5 Drawing Sheets

FIG. 1

FIG. 2 device1\jsmith establish TCP connection for 1.2.3.4/56 to 7.8.9.0/80 at 23:59:01 for 00:00:02

LOG PARSING USING LANGUAGE PROCESSING

TECHNICAL FIELD

Embodiments described herein generally relate to systems and methods for analyzing log records from network devices.

BACKGROUND

Network devices generate log records as part of their routine operation. These log records may include data related to the devices' operation, such as timestamps of actions, interactions with other network devices, etc.

Log records generated by different sources may appear considerably different from one another. For example, they may be formatted differently or may include different types of data. Even log records generated by the same types of devices may be formatted differently due to the designing engineer's specifications or preferences.

Existing techniques for parsing or otherwise analyzing generated log records require non-trivial engineering efforts dedicated to each specific source or source type to address these differences in format and data content. Analyzing log records from various log sources requires building specifically tailored parsing solutions and often requires manual oversight. These existing techniques are time consuming and resource intensive.

A need exists, therefore, for more efficient systems and methods for parsing log records.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for parsing at least one log record. The method includes receiving at an interface a first log record in a first format from a first network device, providing the first log record to a processor executing instructions stored on a memory to provide a language processing model, wherein the language processing model is configured to identify items in the first log record and identify relationships between the items identified in the first log record, and receiving from the model a report comprising the items identified in the first log record and relationships between the items identified in the first log record.

In some embodiments, the method further includes providing the summary to a threat detection module to detect malicious activity associated with the first log record.

In some embodiments, the method further includes receiving at the interface a second log record in a second format from a second network device and providing the second log record to the language processing model, wherein the report comprises the items included in the second log record and relationships between the items in the second log record.

In some embodiments, the language processing model is trained on a plurality of log records from different sources.

In some embodiments, the items identified in the first log record include at least one of a byte count, a port, and an IP address.

In some embodiments, the report includes a probabilistic assessment of the identified items or a probabilistic assessment of the relationships between the identified items.

In some embodiments, the language processing model is based on a convolutional neural network.

In some embodiments, the method further includes providing feedback to the language processing model to revise the language processing model.

In some embodiments, the method further includes receiving a plurality of training log records from different sources, annotating the plurality of training log records, and providing the plurality of annotated training log records to train the language processing model.

In some embodiments, the method further includes providing the report to a log searching tool configured to conduct searches on log records.

According to another aspect, embodiments relate to a system for parsing at least one log record. The system includes an interface for receiving at least a first log record in a first format from a first network device, a memory, and a processor executing instructions stored on the memory to provide a language processing model configured to identify items in the first log record, identify relationships between the items identified in the first log record, and generate a report comprising the items identified in the first log record and relationships between the items identified in the first log record.

In some embodiments, the system further includes a threat detection module configured to analyze the report to detect malicious activity associated with the first log record.

In some embodiments, the interface is further configured to receive a second log record in a second format from a second network device, and the report comprises the items identified in the second log record and relationships between the items identified in the second log record.

In some embodiments, the language processing model is trained on a plurality of log records from different sources.

In some embodiments, the items identified in the first log record include at least one of a byte count, a port, and an IP address.

In some embodiments, the report includes a probabilistic assessment of the identified items or a probabilistic assessment of the relationships between the identified items.

In some embodiments, the language processing model is based on a convolutional neural network.

In some embodiments, the interface is further configured to receive feedback regarding the report to revise the language processing model.

In some embodiments, the interface is further configured to receive a plurality of annotated training log records from different sources and provide the plurality of annotated training log records to train the language processing model.

In some embodiments, the system further includes a log searching tool configured to conduct searches on log records.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the description that follow are presented in terms of symbolic representations of operations on nontransient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Most, if not all, computing devices generate log records as part of their routine operation. For example, a firewall generates records logging which devices connect or otherwise interact therewith. In this case, the log records may include data such as the IP address of a device that interacted with the firewall, as well as a timestamp of said interaction.

Similarly, web applications such as social media platforms generate an extraordinary amount of log records. In the case of social media platforms, this data may relate to profiles of users, dates of activity, a user's friends or followers, or the like.

Different types of devices may generate different types of log records. That is, the data present in generated logs may vary across different types of devices that perform different functions. Accordingly, the log records from these different devices, services, or platforms may look considerably different from each other.

Even log records associated with the same types of devices may look considerably different from each other if differently designed or configured. For example, the engineers configuring different firewalls may have their own preferences or specifications regarding what data is collected and how that data is logged and presented.

The number of log record sources will likely exponentially increase in the future. This increase will be accompanied by an increase in the number of different types or formats of log records generated.

Existing log parsers are ill-suited to analyze log records with different formats. For example, existing log parsers are generally only configured to analyze log records associated with a particular source or log records in a particular format. Accordingly, they may be unable to analyze previously unreviewed log records to adequately identify items therein and the relationships between those items.

The present application discloses novel systems and methods for parsing log records in a variety of formats. The features of the various embodiments herein apply a natural language processing approach that utilizes machine learning techniques to dynamically develop statistical models. These models may be based on a body of annotated training data identifying items in log records, which is used to identify items in unreviewed logs and the relationships between the identified items.

Once trained, the model(s) described herein can therefore receive and extract useful intelligence from log records that may not have previously been reviewed or annotated. Log records can therefore be searched and analyzed without human intervention to, for example, identify activity that is indicative of malicious behavior.

Figure 1:
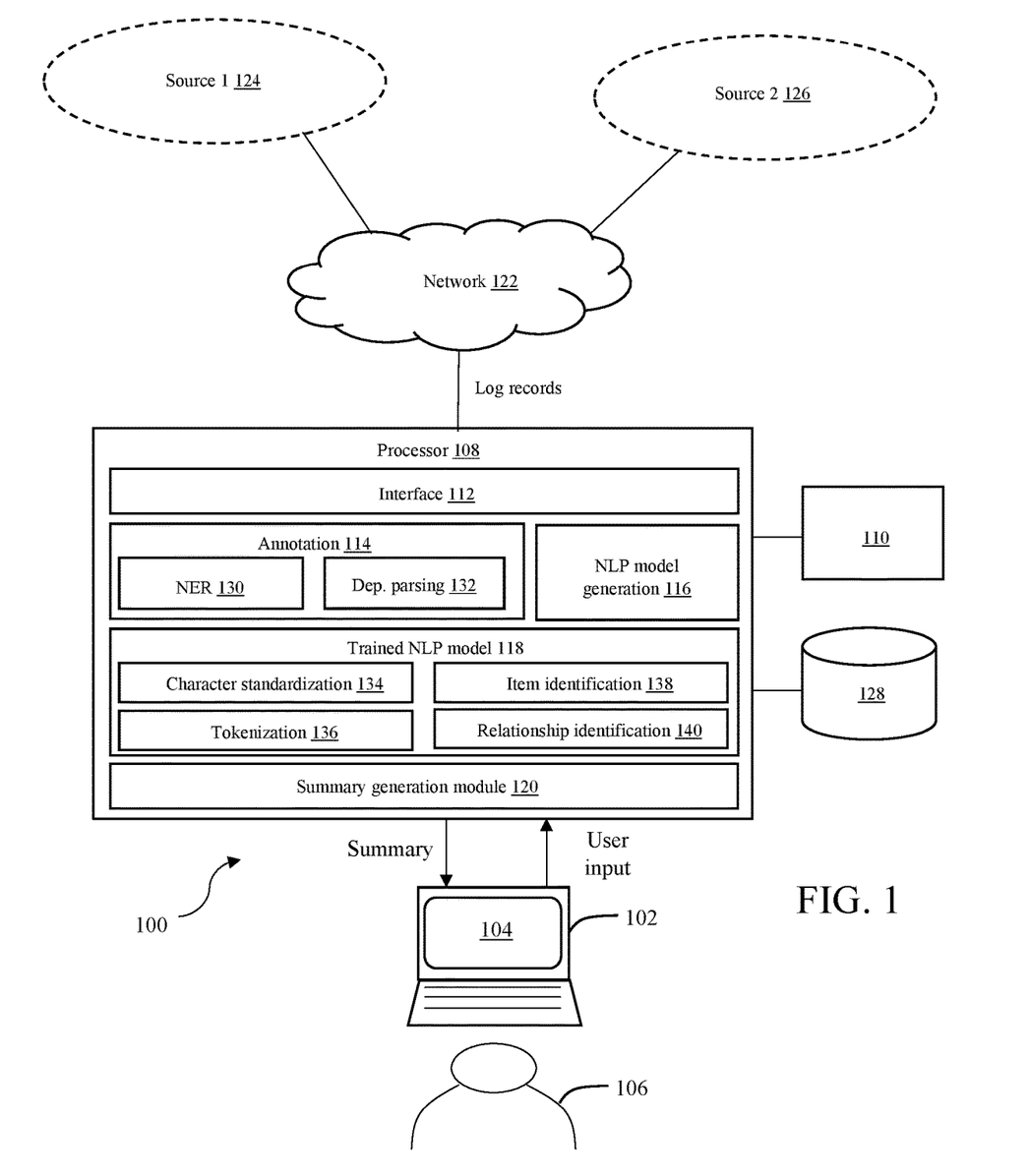
FIG. 1 illustrates a system for parsing at least one log record in accordance with one embodiment.

FIG. 1 illustrates a system for parsing at least one log record in accordance with one embodiment. The system 100 includes a user device 102 executing a user interface 104 for presentation to one or more users 106 such as security personnel or other users interested in the content of log records associated with various sources.

The user device 102 may be any hardware device capable of executing the user interface 104. The user device 102 may be configured as a laptop, PC, tablet, mobile device, or the like. The exact configuration of the user device 102 may vary as long as it can execute and present the user interface 104 to the user 106. The user interface 104 may allow the user 106 to supply parameters regarding which log records to analyze and other types of parameters.

The user device 102 may be in operable communication with one or more processors 108. The processors 108 may be any hardware device capable of executing instructions stored on memory 110 to accomplish the objectives of the various embodiments described herein. The processor(s) 108 may be implemented as software executing on a microprocessor, a field programmable gate array (FPGA), an application-specific integrated circuit (ASIC), or another similar device whether available now or invented hereafter.

In some embodiments, such as those relying on one or more ASICs, the functionality described as being provided in part via software may instead be configured into the design of the ASICs and, as such, the associated software may be omitted. The processor(s) 108 may be configured as part of the user device 102 on which the user interface 104 executes, such as a laptop, or may be located on a different computing device, perhaps at some remote location.

The processor 108 may execute instructions stored on memory 110 to provide various modules to accomplish the objectives of the various embodiments described herein. Specifically, the processor 108 may execute or otherwise include an interface 112, an annotation module 114, a natural language processing (NLP) model generation module 116, the resultant trained NLP model 118, and a summary generation module 120.

The memory 110 may be L1, L2, L3 cache or RAM memory configurations. The memory 110 may include non-volatile memory such as flash memory, EPROM, EEPROM, ROM, and PROM, or volatile memory such as static or dynamic RAM, as discussed above. The exact configuration/type of memory 110 may of course vary as long as instructions for parsing log records can be executed by the processor 108 to accomplish the objectives of various embodiments described herein The interface 112 may have access to one or more networks 122 and may be in communication with one or more sources 124 and 126. The sources 124 and 126 may each refer to a network device, a social media platform, a service, or the like, configured to generate records about its operation. The term "source" and "device" may be used interchangeably.

The network(s) 122 may link the various devices with various types of network connections. The network(s) 122 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 122 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

In operation, the interface 112 may first receive a plurality of log records from one or more sources 124 and 126 as part of a training phase. These may include log records in several different formats to ensure the language processing model can ultimately analyze a variety of log records. Data regarding the received log records and their formats may be stored in one or more databases 128. The received log records may include structured and unstructured log records.

Natural language processing ("NLP") is an application of computational linguistics to enable an artificial intelligence implementation to understand language. NLP is generally based on statistical models that make probabilistic assertions regarding how to understand human language.

The annotation module 114 may annotate the received log records with details that are useful for the generation module 116 in generating the NLP model. The user 106 may provide the annotation module 114 with input to identify items in the log record and supply dependency relationships between the identified items in the log records. The annotation module 114 may include a named entity resolution (for simplicity, "NER") module 130 and a dependency parsing module 132.

The annotation module 114 may operate by executing instructions stored in memory 110 and by consulting data stored in one or more databases 128. Similarly, the user 106 may manually annotate items in the received log records via the user interface 104 to identify items of interest and relationships between the identified items.

A significant component of NLP is named entity resolution. Named entity resolution refers to the process of identifying real-world objects or concepts within language, such as a person ("Bob"), a place ("London"), time ("midnight"), etc.

In the context of log records, named entities may refer to items present in a line of a log record. For example, the NER module 130 may recognize entities or items (for simplicity, "items"), such as IP addresses, ports, byte counts, hosts, users, etc. This is list is merely exemplary, and other items in addition to or in lieu of those mentioned here may be identified.

Figure 2:
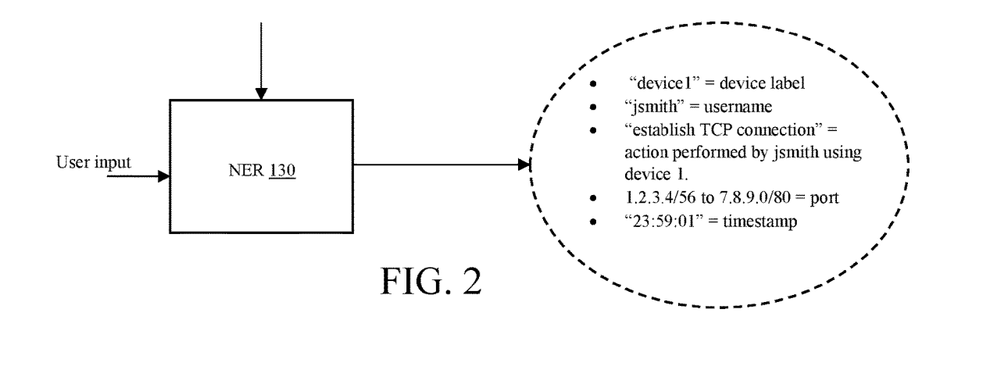
FIG. 2 illustrates the named entity resolution (NER) module of FIG. 1 receiving user input to annotate items in a log record as part of a training phase in accordance with one embodiment.

FIG. 2 illustrates the NER module 130 of FIG. 1 identifying named entities in the log line "device1\jsmith establish TCP connection for 1.2.3.4/56 to 7.8.9.0/80 at 23:59:01 for 00:00:02." Also shown in FIG. 2 is the NER module 130 receiving user input to assist in annotating this portion of a log record.

Another component of NLP is the process of identifying relationships between components within language. This process is known as dependency parsing. In the realm of human language, the statement "the fast moose ran across the road" is densely packed with dependency relationships. Dependency parsing would involve recognizing that "fast" modifies the subject "moose", the word "ran" is a verb that has dependency relationships with both "moose" and "across", etc.

Figure 3:
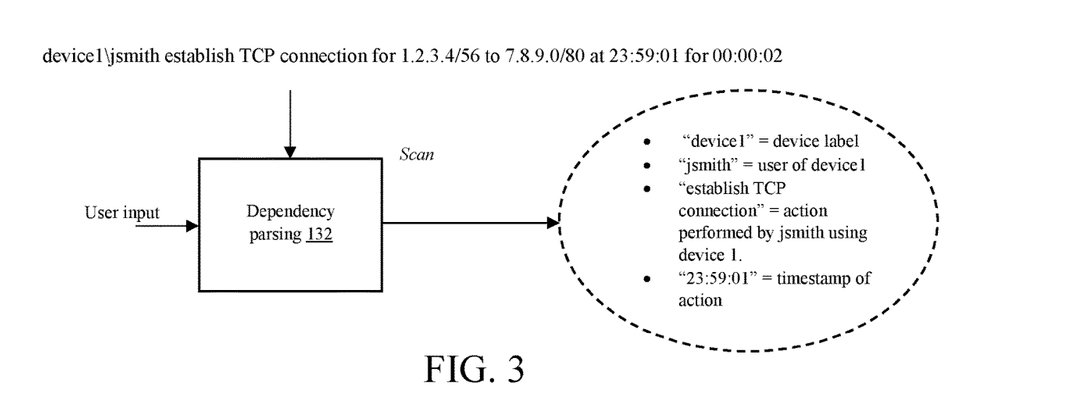
FIG. 3 illustrates the dependency parsing module of FIG. 1 receiving user input to annotate relationships between the items identified in FIG. 2 as part of a training phase in accordance with one embodiment.

Considering again the log record "device1\jsmith establish TCP connection for 1.2.3.4/56 to 7.8.9.0/80 at 23:59:01 for 00:00:02", the dependency parsing module 132 may recognize dependency relationships between a user and a device, between a source and destination, between a source and its port, etc. For example, FIG. 3 illustrates the dependency parsing module 132 identifying the relationships between items in this log line.

The NLP model generation module 116 may consider output from one of or both of the NER module 130 and the dependency parsing module 132 (i.e., the provided annotations). The annotations essentially represent a training dataset.

The NLP model generation module 116 may identify patterns in the received data and generalize those patterns for subsequent application. In some embodiments, the NLP model generation module 116 may be implemented as or otherwise be based on a convolutional neural network (CNN) or other type of machine learning framework useful in text sequencing and pattern identification.

Figure 4:
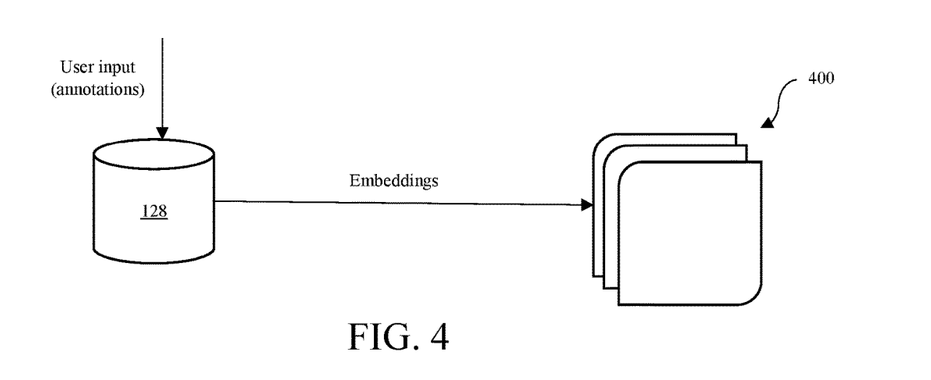
FIG. 4 illustrates user input including annotations being used to train a convolutional neural network in accordance with one embodiment.

A CNN may be trained on the items identified in log records and the relationships between the identified items. As seen in FIG. 4, for example, a CNN 400 may be trained on annotated log record items originating with data stored in the one or more databases 128. This corpus of data may be built from hundreds of annotated log record lines and their corresponding annotations. These may be collected over a period of time and from different log sources.

During training, the CNN 400 may receive the annotated log lines and convert them into a matrix to represent each item and its annotation as numbers. The CNN 400 may also analyze embedded items to learn or otherwise distinguish various classes of items and types of sources.

Once trained, the NLP model 118 may receive previously unreviewed log records for parsing. If necessary, the trained NLP model 118 may perform certain pre-processing steps. For example, the character standardization module 134 may perform any transformation(s) on data to make the data more suitable for analysis. This may involve converting all text to lowercase, uppercase, etc. The tokenization module 136 may break a string into discrete elements to aid in NLP modeling. This may involve, for example, recognizing spaces, periods, punctuation marks, etc., and their meanings with respect to individual items of a log record.

The trained NLP model 118 may then execute the item identification module 138 and the relationship identification module 140 to analyze the received log record(s). The item identification module 138 may recognize items such as device labels, usernames, actions, timestamps of actions, dates of actions, durations of actions, or the like. The relationship identification module 140 may identify relationships between the items identified by the item identification module 138.

Figure 5A:
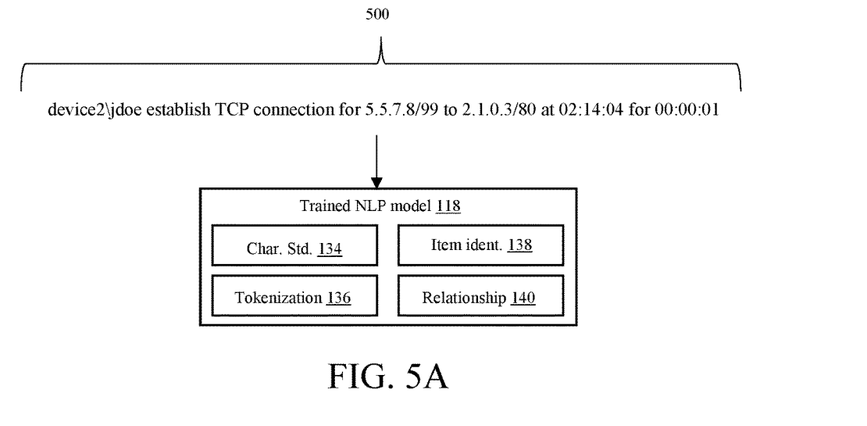
FIGS. 5A-C illustrate the trained natural language processing model of FIG. 1 receiving and analyzing a previously unreviewed log record in accordance with one embodiment.
Figure 5B:
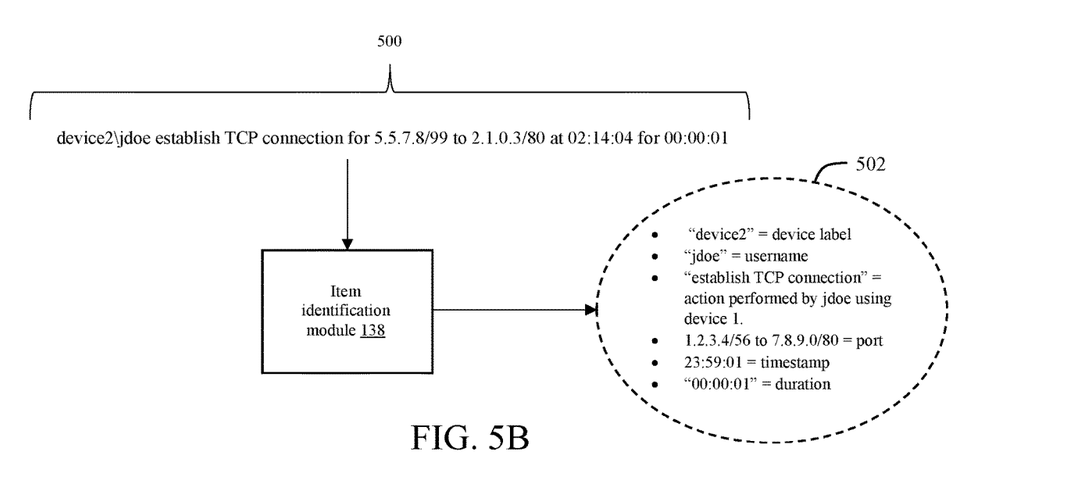
Figure 5C:
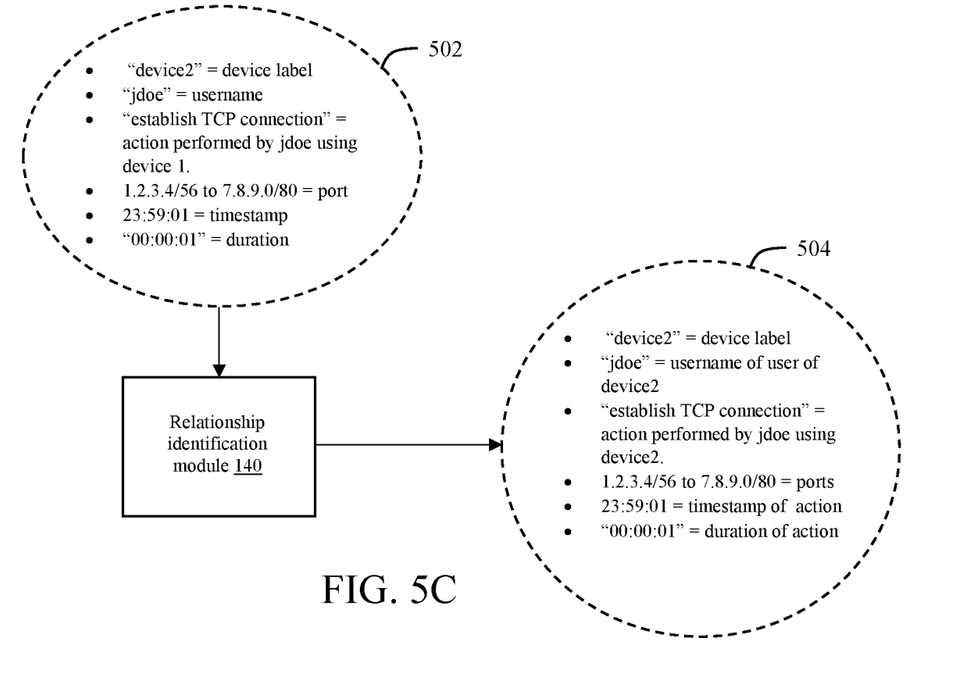

FIGS. 5A-C illustrate an exemplary operation in which the trained NLP model 118 receives a log record 500 (or a line thereof). The model 118 may recognize that this log record 500 is similar to the log record shown in FIGS. 2 and 3.

The character standardization module 134 and the tokenization module 136 may first perform any pre-processing steps. For example, the tokenization module 136 may detect components such as slashes or other types of punctuations to break the log record 500 into discrete components.

Based on knowledge of this type of log record, the item identification module 138 may recognize that the first portion of the log record 500 corresponds the particular device or source of the log. Similarly, the item identification module 138 may recognize that a series of numbers separated by colons represents either a timestamp of an action or the duration of an action.

More specifically, the item identification module 138 may recognize that the item "00:00:01" is a relatively low value, and is therefore more likely to be a duration value as opposed to the time of an action or event. Similarly, the item identification module 138 may understand that integers separated by periods "." to refer to an IP address. For example, the item identification module 138 may recognize "99" in 5.5.7.8/99 and "80" in 2.1.0.3/80 as IP addresses.

As seen in FIG. 5B, the item identification module 138 may analyze the received log record 500 to identify items therein. The item identification module 138 may then output a list 502 of items identified in the log record 500.

FIG. 5C illustrates the list 502 generated by the item identification module 138 in FIG. 5B being provided to the relationship identification module 140. The relationship identification module 140 may identify relationships between the items identified by the item identification module 138 in FIG. 5B.

For example, the relationship identification module 140 may recognize that the user's username immediately follows the device label. That is, the user represented by the username "jdoe" is the user of the device represented by the device label "device2." As another example, the action "establish TCP connection" may be recognized as being performed by user jdoe using device2. Similarly, the relationship identification module 140 may recognize the duration value "00:00:01" as corresponding to the duration of the action.

As seen in FIG. 5C, the relationship identification module 140 may output a list 504 of identified relationships between the previously-identified items. Once identified, the items and the relationships therebetween may be communicated to products or services configured to receive data concerning network activity through log records. These may include threat detection services to detect harmful or otherwise malicious activity occurring on a network. Additionally or alternatively, the identified items and the identified relationships may be presented to the user 106 via the user interface 104 for analysis.

Figure 6:
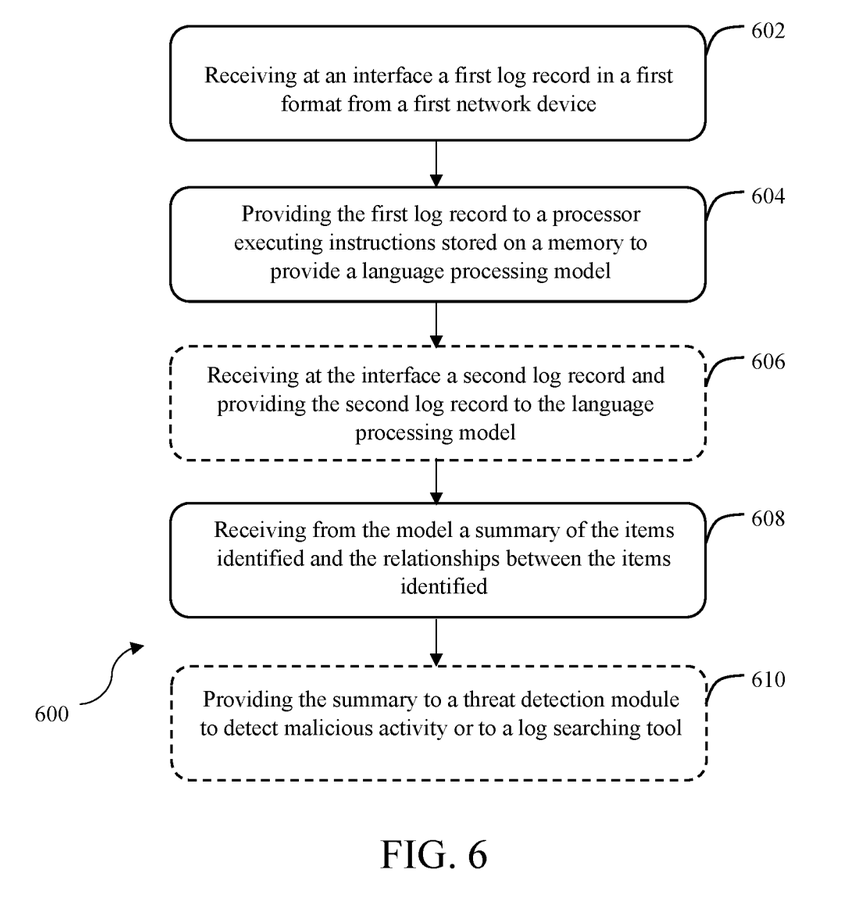
FIG. 6 depicts a flowchart of a method for parsing at least one log record in accordance with one embodiment.

FIG. 6 depicts a flowchart of a method 600 for parsing at least one log record in accordance with one embodiment. The method 600 may be performed by the system 100 of FIG. 1, for example.

Step 602 involves receiving at an interface a first log record in a first format from a first network device. This log record may be from any type of network source such as a firewall, printer, router, PC, tablet, modem, mobile device, or any other type of device, service, or platform on a network.

As discussed previously, different sources may generate log records in different formats. The formats may vary with respect to, for example, the types of data present in the log record, the order in which the data appears in the log record, punctuation marks used to delineate components of the log record, or the like. Accordingly, the "first format" may refer to a specific set of characteristics that define the structure of the first log record.

Step 604 involves providing the first log record to a processor executing instructions stored on a memory to provide a language processing model. The language processing model may be similar to the model 118 of FIG. 1 and is configured to identify items in the first log record and identify relationships between the identified items.

As discussed previously, the language processing model may be trained on a plurality of log records in a variety of formats. Specifically, the language processing model may be trained using NLP techniques to recognize items in the log record as well as the relationships between the identified items. The items identified may include one or more of, for example, a byte count, a port, an IP address, usernames, or the like.

Accordingly, the language processing model may be configured to (1) recognize the format of the first log record; (2) identify items in the log record based on the format of the log record; and (3) recognize the relationships between the items in the log record.

Step 606 involves receiving at the interface a second log record in a second format from a second network device and providing the second log record to the language processing model. The second format may be different from the first format. That is, the second log record may comprise different types of data than the first log record, the second log record may present data in a different order than the first log record, and the second log record may use different punctuations than the first log record.

The language processing model may analyze the second log record to identify items therein. The language processing model may: (1) recognize the second format as being defined by certain characteristics and, (2) identify items in the second log record and the relationships therebetween.

Step 608 involves receiving from the model a summary of the items identified in the first log record and the relationships between the items identified in the first log record. Step 608 may also involve receiving a summary of the items identified in the second log record and the relationships between items identified in the second log record.

The summary may be presented to a user such as the user 106 of FIG. 1 via the user interface 104. This summary may be presented in any suitable formats such as the lists 502 and 504 of FIGS. 5B & C, respectively.

The language processing model may be unable to identify items and relationships with absolute certainty. Accordingly, the summary may include a probabilistic assessment of the identified type of an item (e.g., a port number, a timestamp, a duration value, etc.). Similarly, the model may provide a probabilistic assessment of the identified relationship between items of a log record.

Step 610 involves providing the summary to a log searching tool or a threat detection module to detect malicious activity associated with the first log record. Once the items and relationships therebetween are identified, they can be more meaningfully ingested by other products such as threat detection tools or services.

In some embodiments, a processor such as the processor 108 of FIG. 1 may issue an alert to a user upon detecting activity from the identified items or relationships that is malicious or otherwise anomalous. These types of alerts may be presented to a user via the user interface 104 and may be a visual alert, a text alert, an audio alert, a haptic-based alert, or some combination thereof.

A user may investigate the data further and perform any appropriate mitigation steps. Additionally or alternatively, these mitigation steps may be implemented autonomously.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method comprising:
   receiving at an interface a first log record in a first format from a first network device;
   providing the first log record to a language processing model implemented by a processor executing instructions stored on a memory;
   performing, by the language processing model:
     tokenizing the first log record to identify a plurality of items;
     identifying respective item classes of the items in the first log record, wherein the language processing model is trained to recognize item classes including devices, users, actions, timestamps, and time durations; and
     identifying relationships between the items identified in the first log record, wherein the language processing model is trained to recognize relationships between the item classes including an action is performed by a user, an action is performed on a device, a user is associated with a device, an action is performed at a timestamp, and an action is performed for a time duration; and
   receiving from the model a report comprising the items, the item classes, and the relationships between the items identified in the first log record.

2. The method of claim 1 further comprising providing the report to a threat detection module to detect malicious activity associated with the first log record.

3. The method of claim 1 further comprising:
   receiving at the interface a second log record in a second format from a second network device; and
   providing the second log record to the language processing model,
   wherein the report comprises the items included in the second log record and relationships between the items in the second log record.

4. The method of claim 1 wherein the language processing model is trained on a plurality of log records from different sources.

5. The method of claim 1 wherein the items identified in the first log record include at least one of a byte count, a port, and an IP address.

6. The method of claim 1 wherein the report includes a probabilistic assessment of the identified items or a probabilistic assessment of the relationships between the identified items.

7. The method of claim 1 wherein the language processing model is based on a convolutional neural network.

8. The method of claim 1 further comprising receiving feedback to the language processing model to revise the language processing model, wherein the feedback includes user input that annotates items and relationships in log records.

9. The method of claim 1 further comprising:
   receiving a plurality of training log records from different sources;
   annotating the plurality of training log records; and
   providing the plurality of annotated training log records to train the language processing model.

10. The method of claim 1 further comprising providing the report to a log searching tool configured to conduct searches on log records.

11. A system comprising:
    an interface for receiving at least a first log record in a first format from a first network device;
    a memory; and
    a processor configured to execute instructions stored on the memory to implement a language processing model and use the language processing model to:
      tokenize the first log record to identify a plurality of items;
      identify respective item classes of the items in the first log record, wherein the language processing model is trained to recognize item classes including devices, users, actions, timestamps, and time durations;
      identify relationships between the items identified in the first log record, wherein the language processing model is trained to recognize relationships between the item classes including an action is performed by a user, an action is performed on a device, a user is associated with a device, an action is performed at a timestamp, and an action is performed for a time duration; and
      generate a report comprising the items and item classes identified in the first log record and relationships between the items identified in the first log record.

12. The system of claim 11 further comprising a threat detection module configured to analyze the report to detect malicious activity associated with the first log record.

13. The system of claim 11 wherein the interface is further configured to receive a second log record in a second format from a second network device, and the report comprises the items identified in the second log record and relationships between the items identified in the second log record.

14. The system of claim 11 wherein the language processing model is trained on a plurality of log records from different sources.

15. The system of claim 11 wherein the items identified in the first log record include at least one of a byte count, a port, and an IP address.

16. The system of claim 11 wherein the report includes a probabilistic assessment of the identified items or a probabilistic assessment of the relationships between the identified items.

17. The system of claim 11 wherein the language processing model is based on a convolutional neural network.

18. The system of claim 11 wherein the interface is further configured to receive feedback regarding the report to revise the language processing model, wherein the feedback includes user input that annotates items and relationships in log records.

19. The system of claim 11 wherein the interface is further configured to receive a plurality of annotated training log records from different sources and provide the plurality of annotated training log records to train the language processing model.

20. The system of claim 11 further comprising a log searching tool configured to conduct searches on log records.

* * * * *